3,211,052
OPTICAL READER AND INDICATOR DEVICE
WITH ADJUSTABLE OBJECT LOCATOR
Emanuel Cottesmann, 322 W. 104th St.,
New York 25, N.Y.
Filed Aug. 24, 1960, Ser. No. 51,716
2 Claims. (Cl. 88—24)

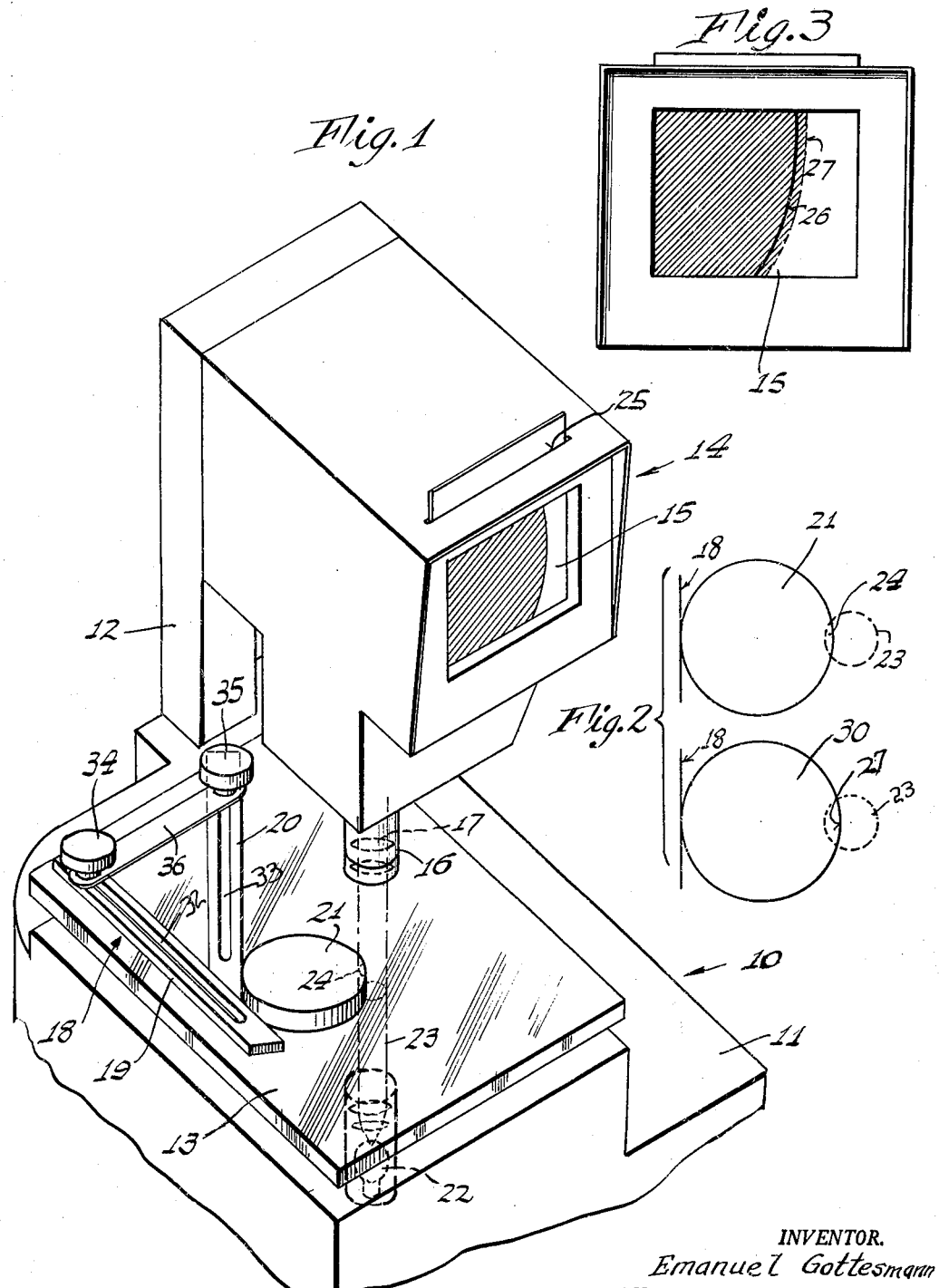

This invention relates to an optical projecting device and, more particularly, to such a device by means of which the plus or minus tolerance of an object may be accurately determined.

Heretofore, in determining the accuracy of the tolerances of an object, it has been necessary to measure, by means of optical projection devices, the entire object or the entire distance to be measured. It was further necesary to use intricate mechanims and complex gauges to determine whether or not the object had been accurately produced. Under such circumstances, the size of the projection device was necessarily determined by the size of the object to be measured. In many instances the projection device, therefore, was difficult to handle and costly to produce. In addition, such devices could not be utilized in relatively restricted areas.

While it has been proposed to provide apparatus for the measurement of cross sections of the profiles of objects using highly complex apparatus, there was no provision for a small, relatively inexpensive and easily constructable and adjustable device to be used for the purpose of determining the accuracy of the tolerances of objects measured thereby.

It is, therefore, an object of the present invention to provide an optical reader and indicator device for accurately checking the tolerances of objects measured thereby.

Another object of the present invention is to provide an optical reader and indicator device which, while relatively small in size, can measure the accuracy of the tolerance of large objects.

Still another object of the present invention is to provide an optical reader and indicator device which may be rapidly and easily produced and assembled and which can check the contour of profiles and holes, inspect external thread surfaces, measure chamfers, and check the surface finishes and quality of various objects.

A further object of the present invention is to provide a reader and indicator device so constructed that the accuracy of the tolerances of objects of various sizes and shapes may be accurately and easily determined.

An important feature of the present invention is the provision of an optical reader and indicator which is so constructed as to provide a novel method for comparing the tolerance of an object.

Another feature of the present invention is the provision of a compact optical reader and indicator device which can determine the accuracy of tolerances of objects which are machined at the point of machining and which is also portable.

Still another feature of the present invention is the provision of an optical reader and indicator device which utilizes an object of accurate tolerance as the comparator for other objects with the size of the measured object having no influence upon the size of the entire apparatus.

Other objects and features of the present invention are set forth in greater detail in the following specification taken in conjunction with the accompanying drawings, in which FIG. 1 is a perspective view of the optical reader and indicator device of the present invention;

FIG. 2 is a top view of objects to be measured, showing the light source for providing the determination of the accuracy of its tolerance; and FIG. 3 is a front view of the viewing screen of the optical reader and indicator of the present invention showing the means by which variations in tolerance are displayed.

According to the present invention, there is provided an optical reader and indicator apparatus comprising a frame 10 having a base 11 and a support 12 extending vertically from said base. A plate 13 is disposed over the base and is transparent for the purpose hereinafter set forth. An image projector 14, provided with a screen 15, is carried by the support. A finder 16 comprising a lens means 17 extends below the base of the image projector. The image projector is internally provided with a conventional mirror arrangement (not shown) for the reflection of images and development of suitable optical path passing through the finder 16 onto the screen 15.

Heretofore, in measuring tolerances of objects in the customary manner, the entire object was displayed on the screen 15. Therefore, for larger pieces or for pieces of complex profiles, the image projected was necessarily of large size to accommodate the entire object. Under many circumstances, the apparatus could not be used at the point of the machining of the object or in relatively restricted areas.

According to the present invention, there is provided locating means in the form of an adjustable stop 18 comprising two bars 19 and 20 angularly disposed to one another and adjustable with relation to each other. The stop 18 is disposed over the surface of the transparent plate 13 and in advance of the finder 16. The object 21 to be measured is placed with portions thereof abutting the walls of the bars 19 and 20.

In accordance with the present invention, a light source 22, located below the transparent plate 13, is so arranged that the light beam 23 only contacts one segment 24 of the work piece whereby the light passing around this segment passes through the finder 16. The image produced is projected and magnified on the screen 15.

In utilizing the device of the present invention, an object of known accurate size is placed in position. The image of a segment thereof is projected on the screen which is composed of a transparency provided with a ground side. The transparency may be removable from the slot 25 in the image projecter. The contour of the outer edge of the segment of the object is then traced onto the transparency by means of any suitable instrument and the standard line 26 thus established becomes the measuring gauge. The transparency presents a plane geometrical outline of the object over the screen with the line drawn thereon constituting the measuring gauge for similar objects to be later measured.

It has been found, according to the present invention, that if there be any inaccuracy in tolerance of the objects which are later measured, this fact will be disclosed through the viewing screen in comparing the outer edge 27 thereof with the standard line previously drawn. As shown in FIGS. 2 and 3, any such inaccuracy will cause the edge 27 of the segment of the object being compared to be out of alignment with the standard line 26 on the transparency. The plus or minus tolerance in any inaccurately produced object will immediately become apparent. It will be understood that such inaccuracies will be reflected no matter where the deviation occurs on the measured object. The measuring means are shown in the form of a transparency purely for exemplary purposes and any suitable indicia, such as providing the viewing screen itself with suitable indicia, may be used. Further, the transparency is removable in order that screens with different indicia may be used as desired.

While the measured object is shown as a circular piece, it will be understood that the same determination may be made with objects of any shape or size.

According to the present invention, there is provided a new and unique method for measuring the tolerances of objects. As indicated in the drawings, the light source 22 is a constant and stationary source whose beam passes around only a segment of the object being measured. A particular predetermined portion of the object is viewed through the screen. In the first instance, an object 21 having proper tolerances is measured through only a segment thereof and becomes the gauge, as heretofore indicated, on the viewing screen. All later objects are placed in the same identical position adjacent and abutting the locating means whereby the light beam 23 transmits a similar segment of later objects to be measured. Where the tolerance is inaccurate as on the piece 30, the light beam 23 will pass around the segment 27 clearly disclosing the inaccuracy of the piece on the viewing screen. It is important to note that the light beam is a constant source and that the identical segment of the object being compared is viewed through the screen. It has been found that this new and novel method of comparative measuring will disclose inaccuracies no matter where present in the object to be measured, as such inaccuracies are clearly reflected in the segment projected.

According to the present invention, there is provided a locator 18 which is so adjusted as to maintain the objects to be measured in identical position with the standard object having accurate tolerances, and all other similar objects are measured in the identical place. For this purpose, bars 19 and 20 are provided with grooves 32 and 33 respectively. Riding in said grooves are threaded knobs 34 and 35 which may be loosened to adjust the position of the bars so that they will act as stops and locators for all sizes and shapes of objects. A guide bar or clamp plate 36 is disposed between the knobs 34 and 35 and the bars 19 and 20. The bar 36 acts as a washer plate when the knobs are tightened to prevent any inadvertent movement of the bars 19 and 20 when they are placed in the proper measuring position. It will be understood that the bars 19 and 20 may be located and locked in position to accommodate all sizes and shapes of objects and that when the standard has been established, all similar objects may be measured from exactly the same location. This provides for absolutely no change in position of the segment of the object being compared from the standard segment and the stationary light beam will pass by similar segments of all objects properly located and abutting the stops. It will be understood that with this segmental viewing, large objects and objects of varying sizes may be compared without the necessity of enlarging the optical reader and indicator device. In addition, as aforesaid, the device will accommodate varying sizes and shapes of objects to be measured.

With the use of the present invention, there has been provided an optical reader and indicator device which discloses the accuracy of tolerances in all objects measured thereon and which, because of its unique construction, requires only a very compact image projector while, nevertheless, measuring the tolerances of objects of large size and of various shape. With this device, it is possible to check the contour of profiles and holes, inspect external thread surfaces, and check the finishes and quality of surfaces with great accuracy.

While the invention has been described in detail, it will be understood that this description is for exemplary purposes and that modifications and variations may be made without departing from the spirit of the invention or the scope of the appended claims.

Having thus described my invention, what I claim is:
1. An optical reader and indicator device comprising
  (a) a frame structure including a base and a support extending from said base,
  (b) an image projector carried on said support, said projector having a viewing screen and a finder lens extending from said image projector, said projector having means for optically enlarging an object arranged to be viewed in light passing through the projector,
  (c) said viewing screen having indicia associated therewith to comprise a comparative gauge against which a segmental part of a given object is to be compared,
  (d) a transparent plate on which an object to be viewed is supported disposed in front of said finder lens,
  (e) a stationary and constant light source being arranged so that the light beam emanating therefrom will contact only a segmental part of the object supported on said plate, and the light contacting said segmental part passing through said finder lens whereupon said segmented part of the object is magnified and projected onto said screen,
  (f) and an adjustable locator cooperatively associated with said plate for accurately determining the position of the objects to be compared so that the light beam will transmit a similar section of all like objects to be compared with said gauge indicia,
  (g) said adjustable locator including a pair of separate and distinct, angularly disposed bars,
  (h) each of said bars being provided with an elongated slot extending substantially coextensively along the length thereof,
  (i) screws for securing the respective ends of said adjustable bars to prevent inadvertent movement of said adjustable bars when adjusted,
  (j) said screws extending through the respective slots formed in said bars so as to fix the position of said bars with respect to said transparent plate when tightened,
  (k) a washer plate extended between the ends of said bars for maintaining them in their adjusted positions.
2. An optical reader and indicator device comprising
  (a) a frame structure including a base and a support extending from said base,
  (b) an image projector carried on said support, said projector having a viewing screen and a finder lens extending from said image projector, said projector having means for optically enlarging an object arranged to be viewed in light passing through the projector,
  (c) said viewing screen having indicia associated therewith to comprise a comparative gauge against which a segmental part of a given object is to be compared,
  (d) a transparent plate on which an object to be viewed is supported disposed in front of said finder lens,
  (e) a stationary and constant light source being arranged so that the light beam emanating therefrom will contact only a segmental part of the object supported on said plate, and the light contacting said segmental part passing through said finder lens whereupon said segmented part of the object is magnified and projected onto said screen,
  (f) and an adjustable locator cooperatively associated with said plate for accurately determining the posi- tion of the objects to be compared so that the light beam will transmit a similar section of all like objects to be compared with said gauge indicia, (g) said adjustable locator including a pair of separate and distinct, angularly disposed bars, (h) each of said bars being provided with an elongated slot extending substantially coextensively along the length thereof, (i) screws for securing the respective ends of said adjustable bars to prevent inadvertent movement of said adjustable bars when adjusted, (j) said screws extending through the respective slots formed in said bars so as to fix the position of said bars with respect to said transparent plate when tightened, (k) a washer plate engageable with both of said bars, said washer plate being apertured at the ends thereof for receiving said screws about which the respective bars are adjusted, said washer plate holding the respective bars against turning as the screws are tightened to fix the bar means.

References Cited by the Examiner

UNITED STATES PATENTS

| | | | |
|---|---|---|---|
| 1,480,390 | 1/24 | Hartness | 88—14 X |
| 1,876,176 | 9/32 | Sulzner | 88—40 |
| 1,934,582 | 11/33 | Bausch et al. | |
| 2,250,309 | 7/41 | Lary | 88—24 |
| 2,780,956 | 1/55 | Fuller et al. | 88—24 |
| 2,802,393 | 8/57 | Young | 88—14 X |
| 2,949,057 | 8/60 | Polidor | 88—14 X |

LEO SMILOW, *Primary Examiner.*

UNITED STATES PATENT OFFICE
CERTIFICATE OF CORRECTION

Patent No. 3,211,052                                     October 12, 19

Emanuel Gottesmann

It is hereby certified that error appears in the above numbered patent requiring correction and that the said Letters Patent should read as corrected below.

In the grant, lines 1 and 12, and in the heading to the printed specification, line 4, name of inventor, for "Emanuel Cottesmann", each occurrence, read -- Emanuel Gottesmann --; in the sheet of drawing, line 1, for "E. COTTESMANN" read -- E. GOTTESMANN --.

Signed and sealed this 28th day of June 1966.

(SEAL)
Attest:

ERNEST W. SWIDER
Attesting Officer

EDWARD J. BRENNE]
Commissioner of Patents